United States Patent
Srinivasan et al.

(10) Patent No.: US 6,304,549 B1
(45) Date of Patent: Oct. 16, 2001

(54) VIRTUAL PATH MANAGEMENT IN HIERARCHICAL ATM NETWORKS

(75) Inventors: Santhanam Srinivasan; Malathi Veeraraghavan, both of Monmouth, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 08/852,892

(22) Filed: May 8, 1997

Related U.S. Application Data

(60) Provisional application No. 60/026,524, filed on Sep. 12, 1996.

(51) Int. Cl.[7] .................................................. H04L 12/28
(52) U.S. Cl. ............................................ 370/230; 370/468
(58) Field of Search .................................. 370/252, 254, 370/398, 395, 397, 409, 410, 468, 450, 230

(56) References Cited

U.S. PATENT DOCUMENTS

| | | | |
|---|---|---|---|
| 5,029,164 | * | 7/1991 | Goldstein et al. ............. 370/235 |
| 5,432,783 | * | 7/1995 | Ahmed et al. ................. 370/397 |
| 5,519,689 | * | 5/1996 | Kim ............................... 370/232 |
| 5,761,192 | * | 6/1998 | Hummel ......................... 370/254 |
| 5,764,740 | * | 6/1998 | Holender ........................ 379/112 |
| 5,872,918 | * | 2/1999 | Malomsoky et al. .......... 709/220 |
| 5,886,982 | * | 3/1999 | Kozaki et al. ................. 370/399 |
| 5,933,412 | * | 8/1999 | Choudhury et al. ........... 370/218 |
| 5,940,738 | * | 8/1999 | Rao ................................ 455/4.2 |

OTHER PUBLICATIONS

M. Veeraraghaven, M. Kshirsagar, G. Choudhury, "Concurrent ATM Connection Setup Reducing Need for VP Provisioning," IEEE Infocom '96, Mar. 1996.

* cited by examiner

*Primary Examiner*—Chau Nguyen
*Assistant Examiner*—Jasper Kwoh

(57) ABSTRACT

This is a method for dynamic and distributed management of Virtual Path Connections (VPCs) in a hierarchical ATM network. VPC parameters, including VPC type (heterogeneous or homogeneous), source node characteristics, end-to-end VPC constraints (GoS and QoS), and the number of on-demand connections to be supported, are determined or specified. Network resources, such as bandwidth and buffer size availability, are also determined. The parameters and information relating to the network resources are sent to a connection server that computes an optimal physical route for the VPC, allocates resources along the computed route, and notifies switches along the route of the new allocation of resources. The switches then change their respective configurations to accommodate the new allocation.

33 Claims, 7 Drawing Sheets

$c_{MAX} = MIN(c_{PEAK}, c_{AVAIL})$  ▦ : FEASIBLE REGION
x: BANDWIDTH MINIMIZED    y: BUFFER MINIMIZED

VIRTUAL PATH MANAGEMENT IN HIERARCHICAL ATM NETWORKS

RELATED APPLICATIONS

This application claims the benefit of provisional U.S. patent application Ser. No. 60/026,524 filed Sep. 12, 1996.

FIELD OF THE INVENTION

The present invention relates generally to bandwidth management in hierarchical ATM communication networks, and more particularly, to an improved method for dynamically adjusting virtual path connection ("VPC") bandwidth allocations in hierarchical ATM communication networks.

BACKGROUND OF THE INVENTION

Asynchronous Transfer Mode (ATM) is the technology of choice for Broadband Integrated Services Digital Network (B-ISDN), a communications standard that supports a range of data, voice, image, video, and multimedia services, with different grade of service (GoS) objectives, such as call blocking probability, as well as quality of service (QoS) objectives, such as cell loss probability and cell transfer delay. This is achieved with careful resource management, i.e., controlled access of network resources, such as link bandwidth and switch buffer resources.

Resource management controls can be implemented at a number of levels in an ATM network. Controls can be applied to Virtual Channel Connections (VCCs), which are connections of virtual channel links (segments of unidirectional transport of ATM cells between a point where a virtual channel identifier (VCI) is assigned to the point where this value is translated or removed), and Virtual Path Connections (VPCs) which are a concatenation of virtual path links, which are terminated by points where the virtual path identifier (VPI) is assigned and translated or removed. FIG. 1 shows an illustration of VCCs and VPCs. Typically, VCCs are set up on demand, while VPCs are preestablished (provisioned), i.e., with bandwidth and buffer resources allocated a priori. Thus, to set up an on-demand connection, e.g., a VCC from end host A to end host B in FIG. 1, Connection Admission Control (CAC) functions and switch fabric configurations are only performed at the terminating points of each VP segment, e.g., at switches SW1 and SW2. As is known, provisioning VPCs offers a number of advantages such as: reducing end-to-end VCC setup delay; use in self-healing networks due to faster rerouting and restoring speeds; a reduction in network "switching" costs since VP cross-connects can be used in parts of the network; and, use in certain applications such as IP-over-ATM networks, where provisioned VPC's improve performance by avoiding a connection setup to transfer connectionless IP packets across an ATM network, and wireless ATM networks where provisioned VPCs between adjacent base stations allows simplified mobile handoffs.

By way of background, VPCs are of two types: homogeneous, if they only support calls of a single traffic class, and heterogeneous, if they support multiple classes of traffic. As the underlying source model of cell arrival rates at a network connection has been shown to be reasonably modeled as a Markov Modulated (MM) process, the modulating process may be represented as a continuous time Markov chain with state transition rates $[m_{ij}]$, $i, j \in \{1, \ldots, K\}$, represented as a matrix M. Based on the characteristics of the modulated process, two types of source models are commonly used, the Markov Modulated Poisson Process (MMPP) model and the Markov Modulated Fluid (MMF) model. In the MMPP model, in any given state i of the Markov process, cells are generated according to a Poisson process with intensity $R_i$. On the other hand, an MMF source, in state i, generates information as a continuous flow (fluid) with a rate $R_i$. In either model, the source intensities are represented as a K×1 vector, R, and the source is characterized by the tuple [M,R]. When cells from multiple sources arrive at a switch, as shown in FIG. 2, the cells are stored in a buffer until the destination port/link is free. Due to finite buffer sizes and the stochastic nature of the sources, buffer overflow leads to cell loss. Thus, as shown in FIG. 2, an important QoS criteria for a connection is the Cell Loss Ratio (CLR), which is the ratio of the total number of cells that are dropped due to buffer overflow to the total number of cells that arrive at the switch, and the Cell Transfer Delay (CTD), which is the time spent in a buffer, before being switched out.

A drawback of using provisioned VPCs with preallocated capacity is that network utilization (transmission efficiency) is reduced since link and node resources are partitioned (rather than shared). This effect is especially true if the resource allocations to VPCs are made allowing for uncertainty in traffic characterization.

The effect of varying traffic patterns can be sharply reduced by using a scheme which dynamically adjusts VPC resource allocations based on usage.

One method for dynamically realizing changes in VPC routes and resource allocations is to use control plane (signaling) software on switches as is done with Soft Provisioned Virtual Circuits (SPVCs). This method inherently possesses two drawbacks in that it uses a sequential node-by-node setup and configuration procedure which may result in excessive and unacceptable VPC adjustment delays and, further requires additional software to monitor VPCs and initiate adjustments, on already overloaded switches.

Several other schemes for the creation and maintenance of VPCs in ATM networks have been proposed. These are largely optimization based schemes for assigning bandwidths to VPCs such that the call blocking probability is minimized. These schemes involve the solution of a complex, non-linear optimization with non-linear constraints. Although these problems may be simplified by using approximations, currently, the optimization is solved periodically in a centralized fashion and the results downloaded to the switches. Additionally, due to their centralized nature, these schemes do not scale well for large networks and fault tolerance becomes a problem since the server which performs the optimization could fail. Although these schemes attempt to achieve optimal call blocking probability, in reality, the approximations and simplifications needed to make the optimization feasible, remove any guarantees of optimality. Also, since the optimization is complicated, it cannot be performed often, thus further compromising the optimality of the assigned bandwidths.

Dynamic management of VPC routes and resource allocations can be done by continuously monitoring the network and reacting to repeated congestion patterns, and topological changes caused by failures and additions of network elements such as links and nodes. The recently standardized Simple Network Management Protocol (SNMP) and the ATM Management Information Base (MIB) currently provide the basis for dynamic solutions. For instance, MIBs reflect the current conditions of the network elements by enabling network managers to communicate with agents on network elements to read and write MIB variables in order to provide dynamic management of VPCs. However, there are several drawbacks in performing dynamic management of VPCs using MIB reads and writes: First, is its inefficiency in a distributed solution which would require various network managers distributed throughout the network to constantly read these MIB variables from the switches thus negatively impacting the performance of the switch agents. Second, is its inefficiency resulting from writing MIB variables to realize changes in VPC routes and resource allocations which can be time consuming.

Thus, besides being dynamic, the VPC management scheme needs to be distributed for the reason that a centralized solution does not scale well with the size of the network, and is also very poor from a fault tolerance perspective.

A distributed scheme for control of VP bandwidths has been proposed, e.g., in S. Shioda and H. Uose, "Virtual path bandwidth control method for ATM networks: successive modification method," *IEICE Trans.*, vol. E74, pp. 4061–4068, Dec. 1991. This scheme is a heuristic which works on the observed call blocking probability on the different VPs, but has drawbacks in that exactly one VPC is allowed between each pair of switches which is a severe restriction, and, the route of each VPC is precomputed and fixed which is not reasonable where a network state is constantly changing as does the "best" route between a pair of nodes.

It would thus be highly desirable to aim for a solution to the VPC bandwidth/buffer/route management problem that addresses the drawbacks and shortcomings of existing dynamic VPC bandwidth management methods. Such a solution to the VPC bandwidth/buffer/route management problem should be scalable with respect to the size of the network and precludes any centralized approaches. Furthermore, such a solution should be robust and be capable of handling network state changes such as network element additions and failures. Moreover, such a solution should not assume fixed precomputed routing of the VPCs but rather provide for the routing VPCs according to the "best" paths, which could change with time as the network state changes. Additionally, the solution should be able to take advantage of existing standards and interwork with them.

SUMMARY OF THE INVENTION

Accordingly, it is an objective of the present invention to provide a distributed and dynamic virtual path management system for dynamically adjusting VPC bandwidth allocation in hierarchical ATM networks.

It is also an objective to provide a distributed and dynamic virtual path management system that is based on switch connection (routing) standards, such as PNNI, that enable network nodes to monitor VPC bandwidth usage, make dynamic VPC bandwidth/buffer modifications, and set up and remove VPCs dynamically.

It is a further object to provide a distributed and dynamic virtual path management system that implements a Parallel Connection Control routing protocol ("PCC") to exploit the inherent parallelism in the connection establishment procedure for faster VPC setup/modification.

In accordance with one aspect of the invention, there is provided a method for automatically provisioning a communication channel between two switching nodes of an ATM network including a plurality of interconnected switching nodes, each switching node including at least a switching element and an associated switch control, the method comprises: obtaining parameters characterizing a type of communication service capable of being provisioned between the two switching nodes in the network; communicating the parameters to a first control device associated with a switching node in the network; communicating information relating to switching element resources currently available at each switching node contained in the network to the first control device; from the parameters and switching element resource information, computing an optimal route between the two switching nodes that is capable of realizing said communication channel and allocating new switching element resources for switching elements contained in the computed route; and, communicating allocated switching element resources to each switch control device associated with a switching node along the route, each switch control device configuring a respective switching element to maintain new switching resources allocated thereto.

Advantageously, the method provides for dynamic monitoring of service usage along the route of the realized communication channel and, re-allocation of the resources of the communication channel for accommodating on demand service changes along the route. Additionally, the system handles network state changes such as link and node failures and additions and is readily adapted to take advantage of existing communications standards and interwork with them.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE INVENTION

The instant invention is a distributed and dynamic VPC management algorithm, ("DIVA"), and system for managing virtual paths connections in organized hierarchical networks. Particularly, DIVA has been designed to use the ATM Forum's PNNI routing protocol which enables information about the network to be gathered and disseminated in a scalable manner. The PNNI routing protocol such as described in The ATM Forum, *Private Network-Network Specification Interface vl.* 0. Mar. 1996, is incorporated by reference as if fully set forth herein.

Specifically, the PNNI routing protocol standard is designed for hierarchical networks in which nodes are gathered into hierarchical Peer Groups (PGs) for scalability reasons. In PNNI, switches within a PG exchange detailed network topology and network state information with each PG having a designated Peer Group Leader (PGL) which participates as a member of a higher level PG. A PGL of a PG at level L represents this PG as a single node in the (L+1)-level PG, and is hence referred to as a logical group node (LGN) at level L+1. Two LGNs may be connected to each other by a logical link which is an aggregate representation of one or more links between the corresponding PGs at the lower level. PGLs obtain routing information about the switches in their PGs and propagate a condensed version of this information to its peers in the higher-level PG. As is known in the PNNI routing scheme described above, the first switch in a PG determines the route of the connection through that PG, and following route computation, resource allocation and switch configurations are performed hop-by-hop (sequentially) at each switch on the route. In a preferred embodiment, to improve upon the switched connection setup procedure proposed in PNNI, the invention implements the Parallel Connection Control (PCC) routing protocol enabling faster VPC setup/modification due to parallel connection setup at the selected switches rather than sequential. The Parallel Connection Control (PCC) scheme such as described in M. Veeraraghavan, M. Kshirasagar, and G. L. Choudhury, "Concurrent ATM connection setup reducing need for VP provisioning," *Proc. IEEE Infocom*, pp. 303–311, 1996, the whole contents and disclosure of which is incorporated by reference as if fully set forth herein, recognizes the inherent parallelism in the connection establishment procedure and executes actions at a number of switches in parallel rather than in sequence.

Figure 3:
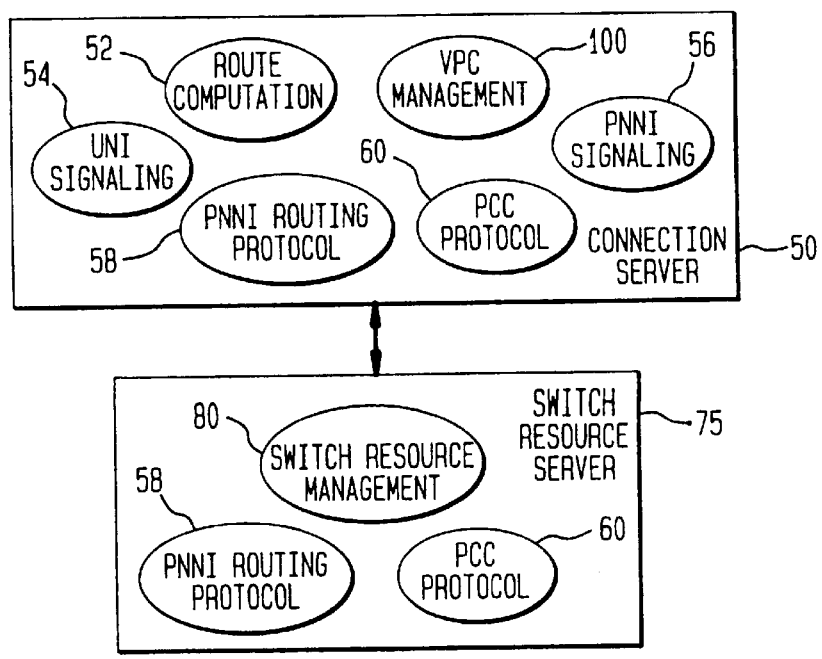
FIG. 3 illustrates the distribution of functions between connection server and switch resource server in hierarchical communicating networks.

Furthermore, as shown in FIG. 3, PCC allocates some of the connection management functions in a functional unit referred to as a connection server 50, and not in the switches. Hence, the additional software for monitoring VPCs and initiating adjustments are moved to the connection servers. Remaining functions are performed by a switch processors, hereinafter referred to as a switch resource servers 75 as shown in FIG. 3. Connections spanning multiple PGs are established by executing actions at the switches within each PG in parallel, as facilitated by the PCC protocol enhancement, but proceeding sequentially from one PG to the next. i.e., the PNNI signaling protocol is used for inter-PG communication.

The detailed distribution of functions between connection servers and switch resource servers is shown in FIG. 3. VPC route computation is performed by a route computation utility 52 running in the connection server 50. Other functions such as, the UNI (User Network Interface) signaling 54, PNNI signaling 56 (for PG to PG connection setup), PNNI Routing protocol 58 (for communicating current topology state information), and the PCC protocol 60 (for parallel intra-PG connection setup) and the software implementing these functions are distributed between connection servers and switch resource servers as shown in FIG. 3. Thus, UNI and PNNI signaling are off loaded from switch resource servers. PCC implementation indicates that connection servers are less loaded than switch resource servers allowing DIVA's VPC monitoring and adjustment initiation, required for VPC management, to be located in connection servers as indicated by VPC Management block 100 in FIG. 3. Connection servers also initiate VPC modifications/setups in response to topological changes reported via the PNNI routing protocol messages. For this added functionality, a primary connection server is assigned to each switch. Any of the other connection servers in the same PG act as alternate connection servers in case of connection server failures, as will be described.

Switch resource management functions 80, such as: Connection Admission Control (CAC) for buffer and bandwidth resource allocations; selecting incoming and outgoing VPIs/VCIs for VCCs, or incoming and outgoing VPIs for VPCs; configuring the switch fabric by setting Port/VPI/VCI translation tables for VCCs or Port/VPI translation tables for VPCs (these are later consulted by ATM cells arriving on the established connection for routing through the switch fabric); and, programming parameters for various runtime (user-plane) algorithms, such as cell scheduling, per VC queuing or per-VP queuing, priority control, rate control, etc., are performed by switch resource servers 75 in addition to some of the PNNI 58 and PCC 60 routing protocol functions.

Figure 4:
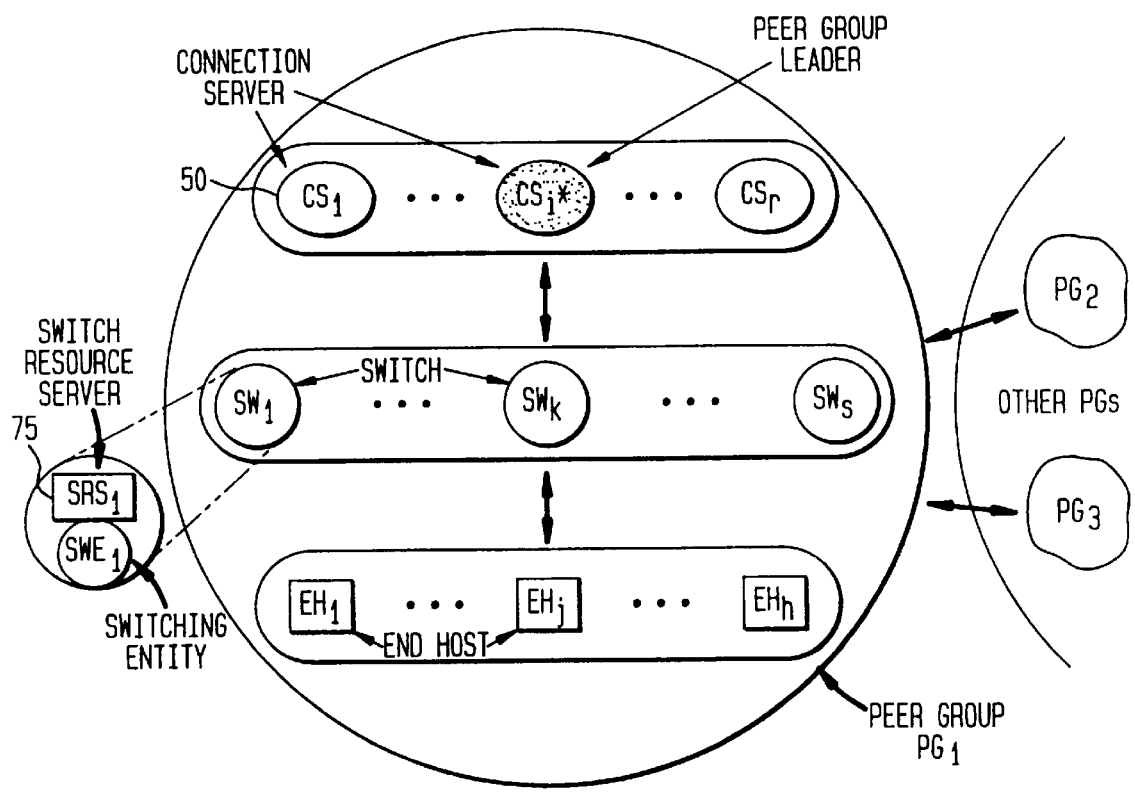
FIG. 4 illustrates generally the PNNI/PCC network architecture of a peer group.

FIG. 4 illustrates the PNNI/PCC network architecture in which DIVA is implemented. The network consists of several PGs, e.g., $PG_1, \ldots, PG_3$ with each PG consisting of switches, e.g., $SW, \ldots, SW_s$, connection servers, $CS_1, \ldots, CS_r$, and end hosts, e.g., $EG_1, \ldots, EG_h$. Each switch, e.g., $SW_1$, additionally consists of a switching fabric, e.g., switching entity $SWE_1$, and a switch resource server 75 (FIG. 3). A connection server is designated to be the Peer Group Leader (PGL) in each PG. For example in FIG. 4, the connection server $CS_i$ is the designated the peer group leader, PGL, for the first peer group, PG1. The PGL selection is done through an election process among all the connection servers, just as in PNNI networks. The switches and connection servers are hereinafter generically referred to as nodes. Nodes in the network communicate with adjacent nodes via bi-directional physical links and non-adjacent nodes communicate over provisioned virtual circuits or through datagram routers, such as IP routers.

Figure 5:
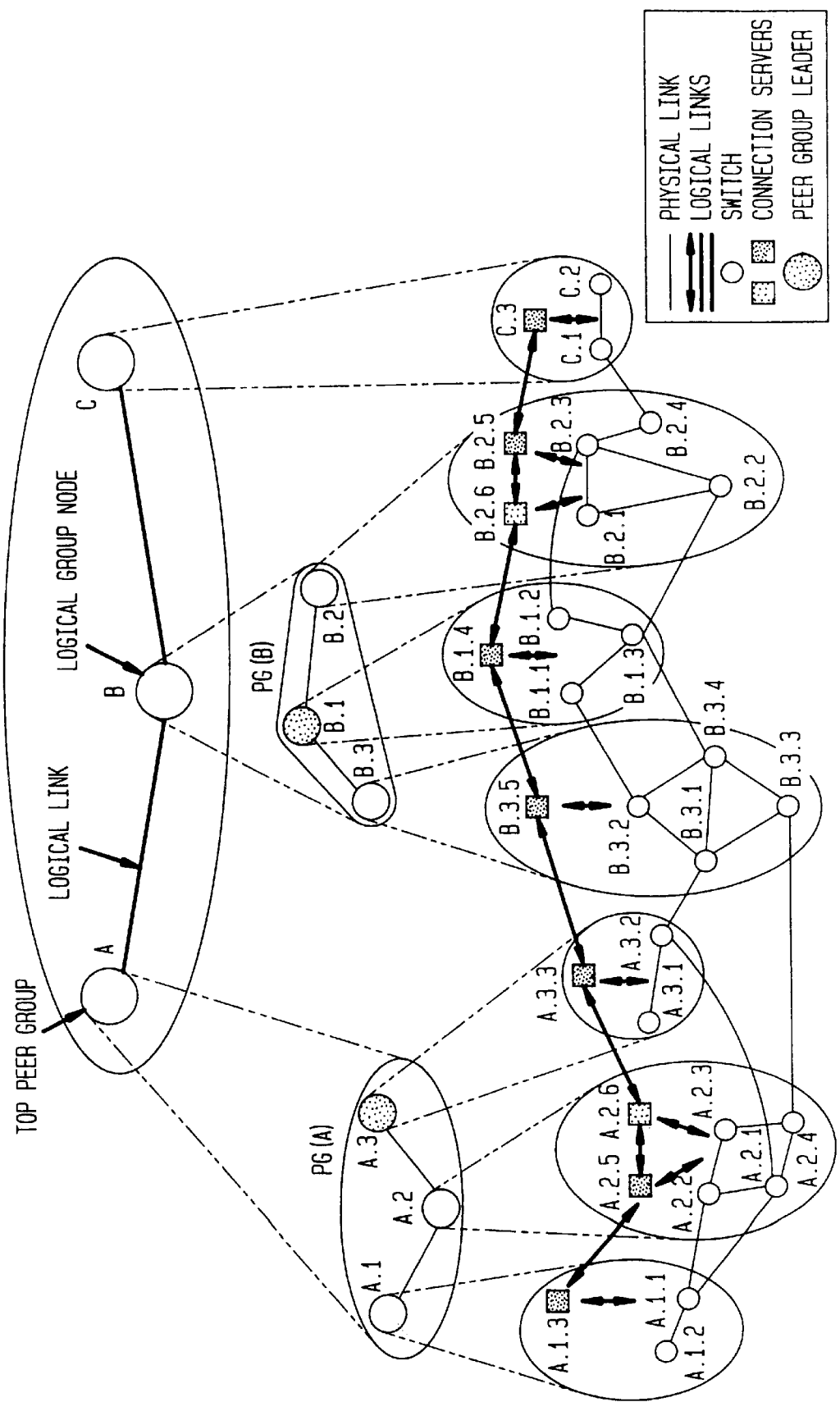
FIG. 5 illustrates an example hierarchically organized network.

An example of such a hierarchically organized network is shown in FIG. 5. In this example, switches A.2.1, ..., A.2.4 and connection servers A.2.5 and A.2.6 have been gathered into peer group PG(A.2). Connection server A.2.5 is the primary connection server for switches A.2.1 and A.2.2, and connection server A.2.6 is the primary connection server for switches A.2.3 and A.2.4. A.2.5 is the peer group leader PGL and represents PG(A.2) as the logical node A.2 in the higher level of the hierarchy. In its turn, A.2 belongs to PG(A) along with LGNs A.1 and A.3, representing PG(A.2) and PG(A.3), respectively. The logical link between A.1 and A.2 is an aggregate representation of the links between nodes in the two corresponding PGs at the lower level.

As is known, PNNI routing messages are of two types, Hello packets and PNNI Topology State Packets (PTSPs). Nodes in the network run a modified version of the Hello protocol. Hello packets are exchanged across each link that comes up and the nodes attached to the link exchange information to establish their identity as well as their PG membership. Each switch also informs each of its neighbors belonging to a different PG the identity of its primary connection server. This piece of information propagates to the connection servers in the adjacent PG and is used for setting up connections spanning multiple PGs. Neighboring nodes also exchange periodic Hello packets which serve as "heartbeats" to monitor the health of the neighboring node.

Switches in the network create PNNI Topology State Elements (PTSEs) about their local state, namely about their own identity and capabilities. Switches do not maintain topology state information and hence do not exchange such information with each other. Instead these PTSEs are encapsulated into PTSPs and sent to the primary connection server of the switch. These PTSEs also contain topology state parameters describing the state of links associated with the node in question as well as all the VPCs originating at the nodes. This information is used by the connection server 50 to perform VPC bandwidth management functions in the VPC Management Block 100 (FIG. 3).

The connection servers in a PG exchange topology state and reachability information with each other in order to synchronize their topology databases. Each connection server reliably floods the connection servers in its PG with detailed information about the state of the nodes for which it is the primary connection server as well as links associated with these nodes. This information is used by the connection servers to perform detailed route computation inside the PG. Also, the PGL condenses this information and floods it in its PG. The PGL also receives such condensed information about other PGs and floods this information among all the nodes in its child PG if this is not a lowest level PG and among the different connection servers in a lowest level PG. PTSEs in the topology databases of the connection servers are subject to aging rules and deletion just as in PNNI based networks.

Figure 6:
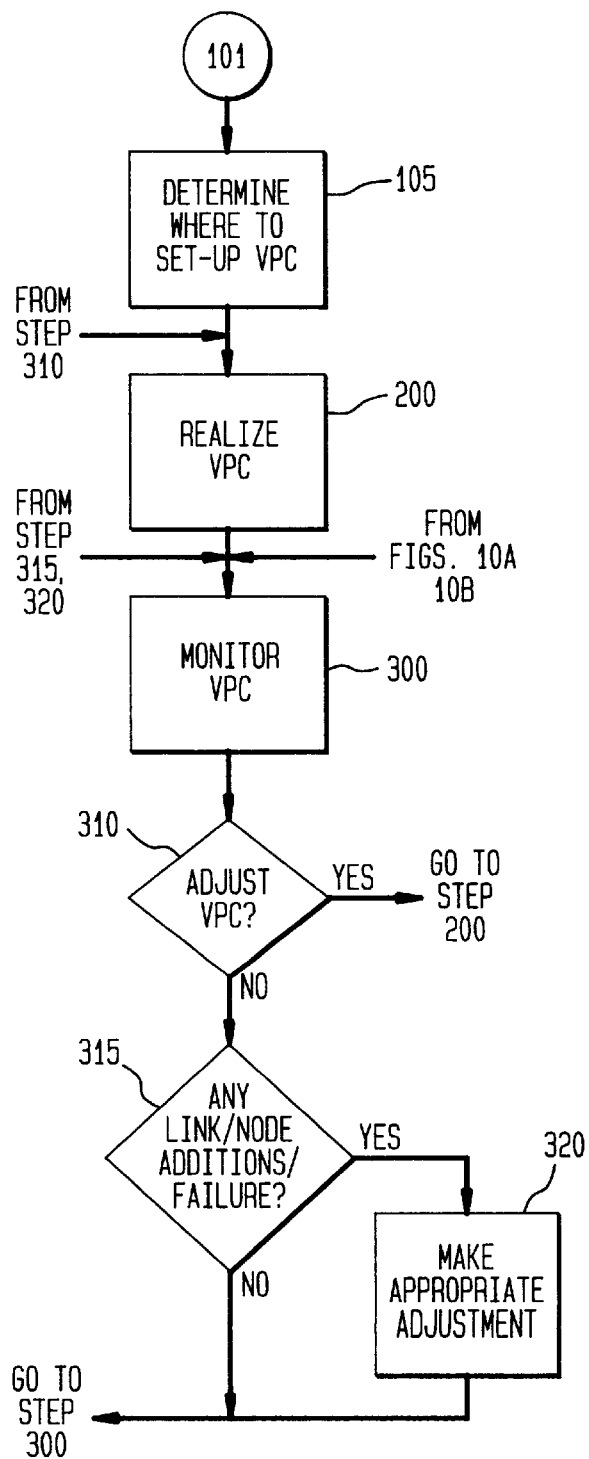
FIG. 6 illustrates generally the DIVA algorithm of the invention.

FIG. 6 illustrates the general flow diagram for DIVA 101 implemented by the VPC management block. Particularly, as shown at step 105, the algorithm first determines where a VPC should be laid. Largely, this is determined a priori based, e.g., on the communication traffic (number of calls), monitored between two points. However, other methods such as a rule-based approach may be implemented. If the traffic is large enough to justify the provision of a VPC between those two points, then the algorithm proceeds to set-up or realize the VPC at step 200. In order to realize the VPC, however, certain parameters must be determined as will be explained herein. Furthermore, as will be explained, the realization process entails the determination of a VPC route, and, additionally, the allocation of buffer and bandwidth resources for the VPC. Furthermore, the algorithm provides a manner for monitoring VPC usage, as indicated at steps 300 and 310, and for making any necessary on the fly adjustments to VPC routes/resource allocations by returning to step 200. Additionally, as part of the monitoring process, DIVA 101 provides a manner for accomplishing changes to VPC configurations in reaction to link and node (a) failures, and (b) additions and restorals, as indicated at steps 315 and 325. Each of these steps will be explained in greater detail hereinbelow.

As indicated above at step 105 in FIG. 6, DIVA may determine, a priori, that the volume of traffic warrants the set up of VPCs between some pairs of nodes, i.e., a pair of switches in the hierarchical network. Specifically, the connection servers 50 perform on-line traffic monitoring and decide based on the collected data. Since one of the functions performed by the connection servers is to receive UNI signaling messages requesting switch virtual connection (SVC) setup and determine routes within its PG to set up SVCs, then each connection server CS, knows the number of on-demand connections set up between each switch SW for which it is the primary connection server, and other switches in the PG. If there is no VPC between switches SW and SW' and the number of connection setup requests over a certain window of time$\tau_{monitor}$ exceeds a threshold $r_{max}$, then the connection server 50 decides that SW and SW' need to be connected by one or more VPCs. Besides determining the node pairs that should be connected by a VPC, some of the parameters of the VPC can also be determined from the SVC setup and release data, namely: the VPC type, i.e., heterogeneous or homogeneous; the source characteristics, i.e., the set of tuples $\{[M_l, R_l], \ldots, [M_k, R_k]\}$ for heterogeneous VPCs with "k" classes of sources, or the tuple $[M, R]$ for homogeneous VPCs; the end-to-end VPC CLR constraint(s) to be supported by the VPC, namely, the set $\{\theta_l^{tot}, \ldots, \theta_k^{tot}\}$ for heterogeneous VPCs, or the single constraint $\theta^{tot}$, for homogeneous VPCs; the end-to-end VPC CTD constraints, namely, the set of constraints $\{\tau_1^{tot}, \ldots, \tau_k^{tot}\}$, for heterogeneous VPCs, or the single constraint $\tau^{tot}$ for homogeneous VPCs; and, furthermore, the determination as to the number of calls (on-demand connections) that need to be supported on the VPC. This parameter can either be directly specified as the set $\{v_l, \ldots, v_k\}$ for heterogeneous VPCs, or $v$to for homogeneous VPCs; or, indirectly specified by giving the Call Blocking Probability (CBP) constraint(s) and offered traffic, namely, the sets $\{CBP_1, \ldots, CBP_k\}$ and $\{\rho_1, \ldots, \rho_k\}$, respectively, for heterogeneous VPCs, or the target CBP and $\rho$for homogeneous VPCs, where $\rho=\lambda/\mu$ is the offered traffic with $\lambda$ equal to the mean rate of calls arriving at a VPC and $\mu$ equal to the mean rate of calls departing from a VPC, and CBP representing the probability that a call gets blocked on the VPC when the resources available on the link are inadequate to support the call. The type of VPC to set up as well as the CBP constraint, either system wide or for each node pair, are specified to the connection servers 50.

Apart from being decided automatically by connection servers, VPCs may be setup based on prespecified rules, or based on requests by the network administrator/network manager. As the traffic monitoring approach applies to those applications where, for lack of better a priori information, connections are allowed to be set up on demand (SVCs) for some time before the connection servers can gather adequate information, through traffic monitoring, to decide that the volume of traffic warrants the set up of VPCs between some pairs of nodes, for some applications, VPCs may additionally be configured from the very beginning between certain pairs of nodes based on a prespecified set of rules. For example, the connection servers can be instructed to set up pair-wise VPCs between each pair of nodes inside each PG. In this case, whenever a switch joins the network, either new or restored after a failure, VPCs are created to all other switches in the PG. Such a rule simplifies SVC setup to choosing a VCI in each PG involved, and setting an entry in the translation table (not shown) of each border node along the route. The rule based VPC approach is also applicable to IP-over-ATM networks where we can avoid connection setup to transfer connectionless IP packets by connecting each pair of IP routers by a VPC. Another example is that of ATM networks supporting mobility, where having a VPC between adjacent base stations speeds up handoffs. In each case, all the parameters needed to set up a VPC, as described above, have to be specified here as well, along with the rules.

A third approach is a VPC request from a network administrator/manager. Each such request has to specify the parameters enumerated above, for every pair of switches, e.g., switches i and m, that have to be connected by one or more VPCs. It should be understood that the three approaches described are not mutually exclusive, and that combinations of the approaches are usually implemented.

Referring back to step 200 of FIG. 6, in order to physically realize the VPCS, it is assumed that a connection server 50 needs to realize a sufficient number of VPCs between two switches i and m with the given set of parameters defined above. Connection servers 50 and switch resource servers 75 (FIG. 3) are involved in the VPC-realization phase.

Figure 7:
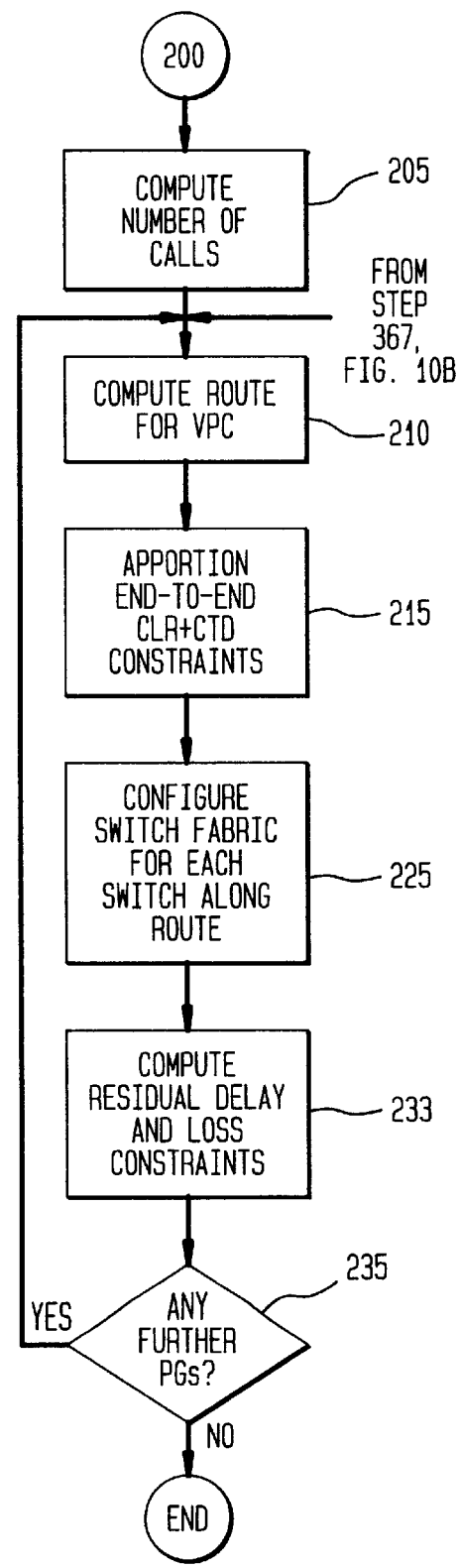
FIG. 7 illustrates steps implemented by DIVA for realizing a VPC in hierarchical ATM networks.

FIG. 7 illustrates the general methodology involved in the VPC realization step 200 of FIG. 6. First, as shown at step 205 in FIG. 7, the connection server computes the number of calls, $v_j$, j $\in\{1, \ldots, k\}$ that should be accommodated in the VPCs, if this is not directly specified. Next, at step 210, the connection server performs route computation for the VPC. Then, at step 215, the connection server apportions the end-to-end VPC CLR and CTD constraints among the switches on the route. Once the constraints of each of the component switches along the route are calculated, then the switch fabric for each switch has to be individually set-up, as indicated at step 225, FIG. 7. This step involves the switch resource servers 75 which perform the following four steps: connection admission control ("CAC"), VPI/VCI selection, switch fabric configuration, and setting runtime parameters. At step 233, the connection server computes the residual delay and loss constraints for any more PGs having switches further down the route in the VPC using the actual delay/loss guarantees reported by the switch resource servers. Finally, a determination is made at step 235 as to whether there are any further PGs along the VPC route. If there are more PGs along the route, then the procedure returns to execute each of steps 210 through 235 for each new PG along the path of the VPC. Once these steps succeed in the final PG, the connection servers in the PGs of the VPC terminating switches set appropriate tables in these switches enabling them to treat each other as logical neighbors. A detailed description of the steps involved in realizing a VPC follows:

At step 205, FIG. 7, the connection server 50 needs to determine the number of calls that must be accommodated on these VPCs. This data may be directly provided in the request or it may need to be inferred by the connection server from the specified call blocking probabilities and offered traffic. If the VPC type parameter indicates that the VPCs should be homogeneous, the connection server can use- the Erlang-B formula, set forth in equation 1 as follows:

$$CBP_j = \frac{\frac{\rho^{v_j}}{v_j!}}{\sum_{i=0}^{i=v_j} \frac{\rho^i}{i!}}, j \in (1, \ldots, k) \quad (1)$$

to compute the number of calls of each service class $v_j$ that needs to be accommodated on the VPCs. However, if the type parameter indicates that the VPCs should be heterogeneous, then one of various methods for computing multi-service class CBP can be used for the converse problem of determining the total number of calls $v_j$, j $\in\{1, \ldots, k\}$, from the specified CBPs and offered traffic $\rho_j$. Such a determination may be found, e.g., in J. S. Kaufman, "Blocking in a shared resource environment," IEEE Trans. Comm., vol. 29, pp. 1474–1481, October 1995; J. -F. Labourdette and G. W. Hart, "Blocking probabilities in multi-traffic loss systems: Insensitivities, Asymptotic behavior, and Approximations," *IEEE Trans. Comm.*, vol. 40, pp. 1355–1366, August 1992; and G. L. Choudhury, K. K. Leung, and W. Whitt, "An inversion algorithm for computing blocking probabilities in loss networks with state-dependent rates," in *Proc. IEEE Infocom*, pp. 513–521, 1995, the whole contents and disclosures of each of these references are incorporated by reference as if fully disclosed herein.

Next, at step 210, FIG. 7, the connection server performs route computation using routing information (reachability and the state of different elements) previously collected via PNNI routing protocol messages. It uses peak rates for each service class, obtained from the [$M_j$, $R_j$] source descriptions, along with the $v_j$ data computed above, to determine the "best" (most likely to succeed) "shortest path" routes for the VPCs and attempts to set up the VPC along one of these routes. Thus, when considering that the example hierarchical network shown in FIG. 5, if connection server A.2.5 wants to set up a VPC between switches A.2.2 (for which A.2.5 is the primary connection server) and B.3-2, connection server A.2.5 uses the information in its topology database to compute a set of possible routes and expresses each as a Designated Transit List (DTL). Suppose, in this case, A.2.5 finds two routes: a first route including nodes (switches) labeled, A.2.2, A.2.1, A.3, B and their and interconnecting physical links, and a second route having nodes A.2-2, A.2.3, A.2.4, B and their links. It first attempts to set up the VPC along the first route. For example, if the VPC has been calculated or specified as accommodating 500 calls, the bandwidth necessary for this VPC may be 100 Mbits/sec. If a link in the first route, e.g., link connecting nodes A.2.2. and A.2.1, has a bandwidth capacity of only 60 Mbits/sec, then that route will be useless and disregarded. Consequently, it will try setting up the VPC along the second route.

Details of DTL computation, which are a little different from PNNI, and the crankback procedure in case of resource reservation failures are now described by way of example. Referring to the hierarchical network shown in FIG. 5, if a VPC needs to be setup between switches A.2.2 and B.3.2, then this VPC will straddle multiple PGs and intra-PG setup is done in parallel, with the PCC enhancement, and inter-PG setup is done sequentially. Assume that A.2.5 is the primary connection server of switch A.2.2 and maintains VPCs for which this switch is the originating point. A.2.5 uses the information in its topology database to compute possible routes for this connection. These routes are expressed as a set of Designated Transit Lists (DTLs). Assume that A.2.5 finds the following two potential alternate routes: (A.2.2, A.2.1, A.3, B) or (A.2.2, A.2.3, A.2.4, B). Further assume that connection server A.2.5 chooses (A.2.2, A.2.1, A.3, B) for its first realization attempt. It builds the following DTLs, in a stack, in accordance with the PNNI Specification Interface v1.0, March 1996, however, is slightly modified to accommodate the PCC enhancement. Thus, the DTL is shown as:

| PNNI/PCC network: |
| --- |
| DTL-1: [A.2.2, A.2.1, A.3.2] pointer-2<br>DTL-2: [A, B] pointer-1 | with the "Pointer" field in each DTL indicating the current destination, except for the top DTL, DTL-1, where it is advanced to the next destination. Note that these DTLs are slightly different from the DTLs that A.2.2 would be able to compute if it were using the PNNI signaling standard for intra-PG connection setup wherein switch A.2.2 would compute the following DTL stack:

| Strictly PNNI network: |
|---|
| DTL-1: [A.2.2, A.2.1] pointer-2 |
| DTL-2: [A.2, A.3] pointer-2 |
| DTL-3: [A, B] pointer-1 | since, A.2.2 does not know that A.2.1 has a neighbor, A.3.2, in PGA-3; only A.2.1 does. However, in the preferred PNNIIPCC architecture, connection server A.2.5, which receives PTSPs from A.2.1, knows this information, and hence computes the DTL as shown earlier for the PNNI/PCC network. A.2.5 then proceeds to process the top DTL in two phases. In the first phase it sends a Resources-Reserve message to the SRS in A.2.2 and A.2.1 in parallel, requesting them to set aside the specified resources to set up a VPC. Each SRS queues all such requests and processes them sequentially. This allows multiple connection servers to simultaneously contact an SRS without causing any deadlocks. Each SRS performs CAC functions (computing bandwidth and buffer resources as described above) and if it is able to satisfy a request for resources, the SRS sets aside these resources and marks them as unavailable. It also selects VPIs to be used for this VPC. If successful, it sends a Resources-Available message back to the requesting connection server. If the requested resources are not available, it responds with a Resources-Unavailable message.

Connection server A.2.5 waits for a response from both switch resource servers. If the first phase is unsuccessful, it receives Resources-Unavailable messages from one or more switches. It then aborts processing the DTLs for the currently chosen route, releases resources on switches which were successful in reserving resources, and then may attempt a different route. If the first phase is successful, it sends a Configure-Switch message in parallel to all the switches. An SRS receiving this message sets port/VPI translation table entries for the VPC as well as the necessary parameters for user plane algorithms such as cell scheduling.

Once A.2.5 has successfully completed processing the current DTL, it updates the pointer in DTL-1 at the top of the stack. The DTL stack then is configured as follows:

| DTL-1: [A.2.2, A.2.1, A.3.2] pointer-3 |
|---|
| DTL-2: [A, B] pointer-1 |

The next hop is A.3.2 in PG A.3. Since A.3.3 is a connection server in A.3, A.2.5 sends a SETUP-SEGMENT message to A.3.3. The port/VPI selected on this interface between A.2.1 and A.3.2 are parameters of this message. Note that a logical link exists between PGs A.2 and A.3, and a logical signaling link is pre-setup between the PGLs of these two PGs, namely A.2.5 and A.3.3. Even if this were not the case, signaling packets can be forwarded via datagram routers, such as IP routers or Signaling Transfer Points ("STPs").

A.3.3 deletes the top entry and the DTL stack now becomes: DTL-1: [A, B] pointer-1. A.3.3 needs to route the connection to reach PG B to the final destination B.3.2. Switch A.3.3 uses the two phase approach to set up the connection through A.3.2. Let us assume that A.3.2 does not have enough resources and this fails. A.3.3 now starts a crankback procedure by sending a Release message back to connection server A.2.5, which, in turn, uses a parallel release approach and communicates with each SRS on the VPC and releases resources. A.2.5 then examines the network to choose an alternate route. If it decides to attempt the alternate route (A.2.2, A.2-3, A.2.4, B), it follows a similar procedure.

At step 215, FIG. 7, for each selected route, the connection server 50 needs to apportion the end-to-end VPC CLR and CTD, for traffic class j, $\theta_j^{tot}$, $\tau_j^{tot}$, respectively, among the switches on the route. This may be a complex problem, especially if switches from multiple vendors are to be accommodated. Preferably, however, the connection server may be equipped to provide more sophisticated solutions to solve this problem more effectively. For VPCs spanning one PG, the connection server knows the number of switches on the route, n, and hence can determine a maximum per-switch delay requirement for service class j, $\tau_j$, to $$\frac{\tau_j^{tot}}{n_s},$$

ignoring cell transfer delay along the link (which is typically very small). As an example, for a total end to end delay constraint of, e.g., 20 milliseconds along a route containing four nodes (switches), the algorithm translates this requirement to a per switch constraint. In equal partitioning among all the switches in the route, each of the four (4) switches may be equally allocated a loss of, e.g., 5 milliseconds. Alternatively, the algorithm may decide to partition such constraints among the route nodes in an unequal fashion. For example, if a switch is loaded, then that node may be allocated a lower delay constraint, e.g., 12 milliseconds, and the next nodes along the route will have the remaining 8 milliseconds allocated amongst themselves.

For VPCs spanning multiple PGs, only an estimate of n, can be made by the connection server based on an estimate number of PGs the VPC passes through and an estimate of the number of switches in each, since it may not know the number of lowest-level PGs through which the VPC must be routed and find the exact number of switches in these PGs.

A similar approach is used for dividing the end-to-end VPC CLR, $\theta_j^{tot}$, for service class j among the $n_s$ switches on the route. If CLR constraint is equally distributed among the switches, the CLR constraint on each switch for service class j, $\theta_j$ is derived from the following approximation set forth in equation (2) as follows:

$$(1-\theta_j)^{n_s} = (1-\theta_j^{tot}) \Rightarrow \theta_j = 1-(1-\theta_j^{tot})^{\frac{1}{n_s}} \quad (2)$$

Figure 8A:
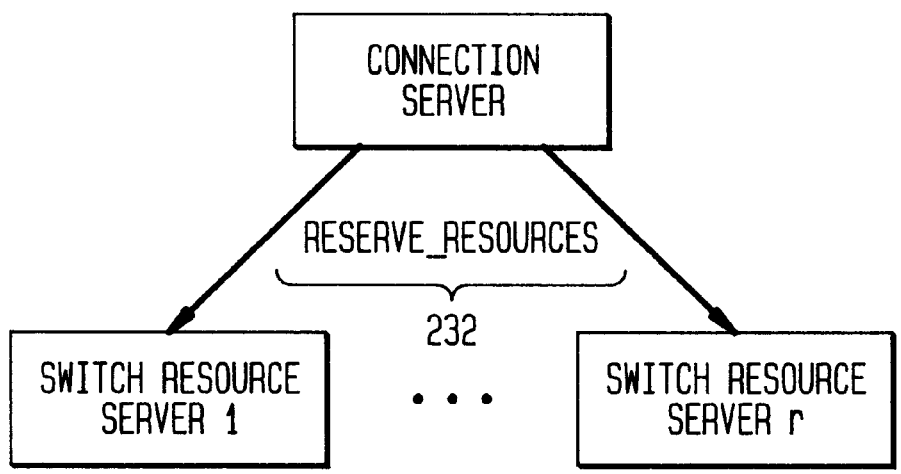
FIGS. 8(*a*) and 8(*b*) illustrate the various means by which a connection server communicates resource allocation (FIG. 8(*a*)) and switch fabric configuration messages (FIG. 8(*b*)) in parallel to respective associated switch resource servers.
Figure 8B:
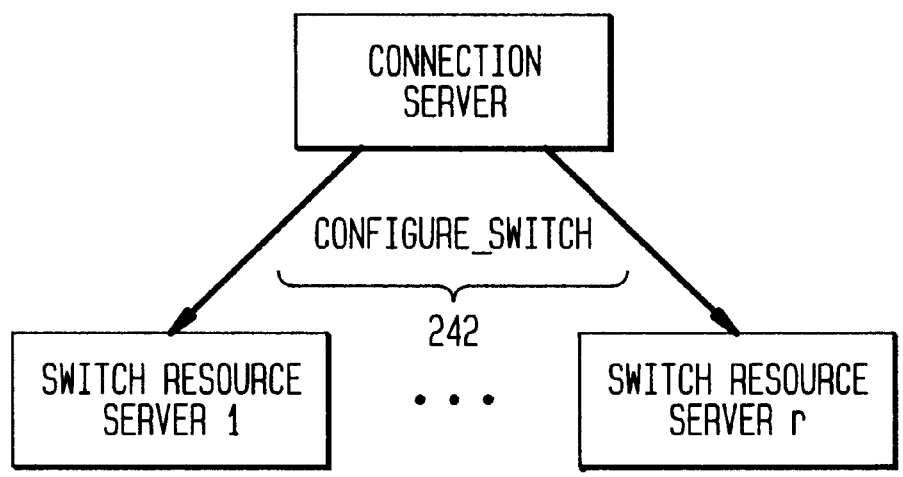

Once the constraints of each of the component switches are determined along the path, then the switch fabric for each switch has to be individually set up, which is a four step process as mentioned above with reference to step 225, FIG. 7. Specifically, the VPC switch fabric within a peer group (PG) is setup sequentially, in accordance with the PNNI protocol. Furthermore, inter-PG setup is accomplished sequentially from one PG to the next. Preferably, however, with the PCC protocol enhancement, switch fabric for switches within a PG may be performed in parallel, with the information downloaded from the connection server to each switch within the peer group. In this instance, connection setup within a PG consists of two phases: a resource reservation phase, as shown in FIG. 8(a), and a fabric configuration phase, as shown in FIG. 8(b). In the resource reservation phase, the connection server sends a ReserveResources message 232 to the SRSs (Switch Resource Servers) for the switches of the selected route, (in parallel), requesting them to set aside the necessary resources. Each SRS that receives such requests pushes them into a queue and processes them sequentially. This allows multiple connection servers to simultaneously contact an SRS without causing any deadlocks. Each Reserve-Resources message 232 specifies the parameters [Mj, Rj], $\theta_j$, $\tau_j$ and $v_j$ for each service class j. Each SRS then performs CAC (Connection Admission Control) functions to determine if it can satisfy the request. However, to do this, the SRS must determine the required bandwidth and buffer resources from the parameters specified in the Reserve-Resource message.

Figure 2:
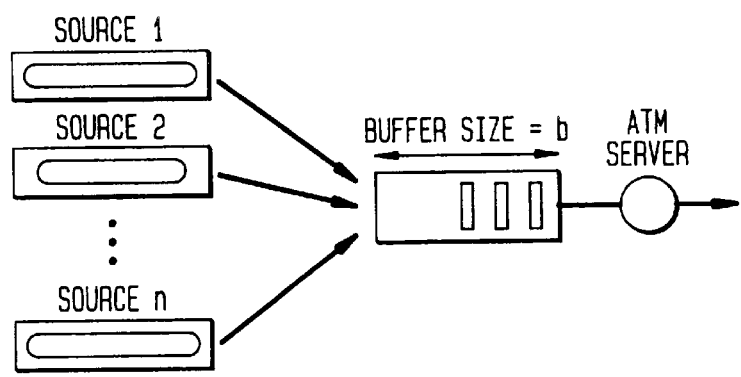
FIG. 2 illustrates several sources multiplexed at a buffer.

In DIVA, buffer and bandwidth allocations are performed simultaneously. Given a buffer of size "b" cells which is being emptied at a constant rate of "c" cells/second, as depicted in FIG. 2, it is evident that the maximum delay, $\tau_j$, experienced by a cell from the time it enters the buffer to the time it leaves the buffer, is $$\frac{b}{c}.$$

Thus, the other constraint on b arises from the CLR required, in accordance with equation (3) as follows.

$$\frac{b}{c} \le \tau_j \quad (3)$$

If the cells of a (set of) connection(s) are queued in a switch buffer of a certain size b, for a specified CLR (e.g., $\theta$), the equivalent bandwidth of this (set of) connection(s), $c_{eq}$, is the constant rate at which the buffer has to be emptied such that the probability of buffer overflow is $\theta$. It is understood that the bigger the buffer size b, the smaller the rate at which the buffer has to be emptied (the equivalent bandwidth) to maintain a given CLR. The expression for $c_{eq}$, as a function of b, $\theta$ and the statistical characteristics of the (set of) connection(s) has been derived and skilled artisans may avail themselves of a variety of methods for computing equivalent bandwidth. The equivalent bandwidth of a set $S_n$ of n connections with the same statistical characteristics, is denoted as a function of b and $\theta$ such that $c_{eq}(b, \theta, S_n)$. If bandwidth resources are scarce, the total bandwidth assigned to the (set of) connection(s), $c_{eq}(b, \theta, S_n)$ must be minimized. Since the equivalent bandwidth formula is a decreasing function of b, and given equation (3) it is determined that the value of b satisfying the delay bound and minimizing the bandwidth requirement is the minimum of (a) the maximum buffer size $b_{max}$ available at the switch for the VPC, and (b) the solution of the equation (4) which has a unique positive solution and is set forth as follows:

$$\frac{b}{C_{eq}(b, \theta_j, S_n)} = \tau_j \quad (4)$$

Figure 9:
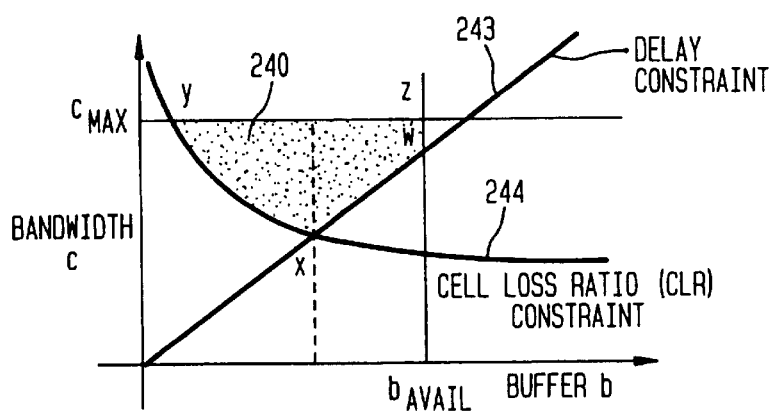
FIG. 9 illustrates the relationship between allocated bandwidth and buffer size and the CLR and CTD constraints on the switch.

FIG. 9 shows the relationship between the allocated bandwidth (vertical axis) and buffer (horizontal axis), and the CLR and CTD constraints on the switch. The shaded region 240 shows the range of allowed values for the buffer size b and bandwidth $c_{eq}$, such that all the constraints are satisfied. This region is computed based on the following bounds:

1) an upperbound $c_{max}$ on the bandwidth to be allocated to the VPC which is the minimum of the maximum bandwidth, $c_{avail}$, available on the outgoing link, and the peak rate, $c_{peak}$, of the traffic using the VPC;
2) the upperbound on the cell delay, represented by line 243 in FIG. 9, that the connection can experience at this switch; and,
3) the upperbound on the CLR, represented by line 244 in FIG. 9, that the connection can experience at this switch; and
4) the maximum buffer space, $b_{avail}$, available at the switch (for this connection).

While Equation 4 illustrates the choice of buffer and bandwidth in order to minimize the bandwidth allocation, in general the SRS is free to choose any buffer size and bandwidth that lies inside region 240. Note that points on the segments indicated in FIG. 9 as w-x and x-y satisfy both the delay and CLR constraints and are such that lowering either the buffer allocation or the bandwidth moves the switch out of the feasible region 240. In this sense, these points correspond to minimum resource allocations. However, the SRS might choose a point inside the region 240, thus, realizing a better delay/CLR than the constraints specified. Such a choice effectively eases the constraints on the switches further down the route of the VPC and increases the probability that the VPC will be successfully routed.

The above-described technique assumes that bandwidth allocations are made assuming statistical multiplexing is exploited on each SVC and among several SVCs routed on a VPC. This assumption can be made for homogeneous VPCs. It has been observed, however, that for heterogeneous VPCs, call-level statistical multiplexing gains achieved by establishing SVCs of different service classes on a VPC can be negated by requiring all service classes to be treated in the same manner as the service class with the most stringent requirements. Hence, for heterogeneous VPCs, no call-level multiplexing is assumed, i.e., peak rate bandwidth allocations are made determined directly from the [$M_j$, $R_j$] source characterization. The buffer allocation is determined from the per-switch delay constraint. Peak rate allocations imply zero cell loss, which implicitly meets any cell loss constraint.

After computing the required bandwidth and buffer resources, if the SRS determines that it has sufficient resources to meet these requirements, it sets aside these resources and marks them as unavailable. It also selects VPIs to be used for this VPC. It then sends a Resources-Available message back to the requesting connection server. If the requested resources are not available, it responds with a Resources-Unavailable message.

In the example hierarchical network described with reference to FIG. 5, connection server A.2.5 will send Reserve-Resources messages to switches A.2.2 and A.2.1, both inside its PG(A.2). Node A.2.5 then waits for a response from each SRS contacted.

In FIG. 8(b), if the first phase is successful, then the connection server, e.g., A.2.5 in the example network of FIG. 5, enters the second phase by sending a Configure-Switch message 242 which are executed by all the switches on the route within its peer group, as indicated in FIG. 8(b). Specifically, when implementing the PCC protocol, a Configure-Switch message 242 is sent in parallel to all the SRS switches in the route. An SRS receiving this Configure-Switch message 242 sets port/VPI translation table entries, i.e., it configures the switch fabric to realize the VPC. It also sets buffer allocations for the VPCs (assuming per-VP queuing in the nodes) and provides the allocated bandwidth to the switch scheduler for enforcement.

For multi-PG VPCs, a connection server 50 in each PG performs this two phase setup approach (illustrated in FIGS. 8(a) and 8(b)) for the switches in its PG. Specifically, once responses carrying actual delay guarantees are received by the connection server 50, it uses these to compute the residual constraints to be satisfied by switches in PGs further down the route, as indicated at step 233 in FIG. 7. Specifically, the real numbers are obtained and reported back to the connection servers which re-calculate the delay and loss constraints, and subtracts them off the estimated values for the nodes, to send it further down the road to the next connection server. PG to PG setup proceeds sequentially using PNNI signaling messages for communication between connection servers in different PGs.

Figure 1:
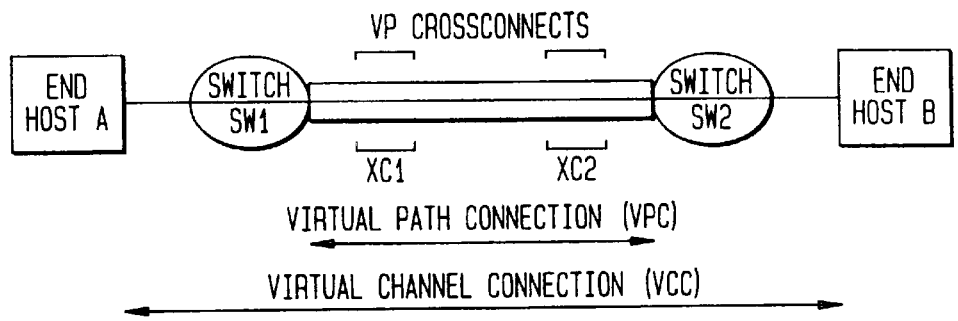
FIG. 1 is a block diagram illustrating an example VCC and VPC in an ATM network.

Once the above steps 210–233 in FIG. 7 are completed successfully in the last PG along the route of the VPC, appropriate data tables are created at the VPC terminating switches, by the connection servers in the PGs of these switches, to enable them to treat each other as "logically connected" neighbors. For the example, in FIG. 1, SWI and SW2 will be programmed with the appropriate data to enable SVC route computation algorithms to treat them as logically connected neighbors.

The next step, as indicated as step 310 in FIG. 6, is to determine whether on the fly adjustments are to be made to VPC routes and resource allocations. As indicated at step 300 in FIG. 6, this is done using one of two approaches: by monitoring call blocking probabilities or by monitoring VPC cell usage. Using the periodic updates received from each switch SW for which it is the primary connection server, each connection server 50 monitors the state of each VPC associated with the switches. For example, it be the case that efficient bandwidth utilization is set to be between 80% and 90%. If VPC usage goes beyond this percentage, e.g., the VPC may start blocking calls; if it goes below this percentage, the VPC resources are being under utilized. In either case, corrective action may be taken by decreasing bandwidth allocation for a VPC, in the case of under-utilization, or, e.g., provisioning another VPC, i.e., another route, between the same two nodes, in the case of over-utilizing VPC resources.

More specifically, if, in a predetermined time-frame, either (a) the observed CBP $\beta_{meas}$ on a VPC is not within a specified range $[(1-\rho_{1l})\times\beta, (1+\rho_u)]$ where the target CBP for the VPC is $\beta$, or the average occupied bandwidth $c_{occ}$ is not in the range $[\min\times c_{actual}, \max\times c_{actual}]$, the primary connection server 50 of one of the terminating switches of the VPC takes corrective action.

When $\beta_{meas}<(1-\rho_l)\times\beta$ or $c_{occ}<\min\times c_{actual}$, it attempts to reduce the allocated bandwidth. The connection server uses the two-phase approach described above with reference to FIGS. 8(a) and 8(b) to realize this adjustment of lowering the assigned bandwidth (expressed as a percentage in the Reserve-Resources message). The exception to this bandwidth reduction step is when the VPC bandwidth is smaller than a minimum $c_{min}$. In such a case the connection server marks the VPC as "frozen". No more connections are admitted on this VPC and it is allowed to empty out. When the last call completes, the VPC is torn down and the resources recovered.

On the other hand, when the bandwidth is inadequate to support the required CBP and $\beta_{meas}>(1+\rho_u)\times\beta$ or $c_{occ}>\max\times c_{actual}$, the connection server attempts to increase the bandwidth assigned to the VPC. This is also done using the two-phase approach described above with reference to FIGS. 8(a) and 8(b). Particularly, in the first phase, the connection server contacts the first switch in the peer group which sends the necessary information to each of the switches along the route to request the increase in bandwidth. Preferably, the PCC protocol is implemented so that the connection server contacts all of the switches in parallel requesting an increase in bandwidth (again, expressed as a percentage). In the second phase, it sends a commit request. If the attempt to increase bandwidth fails, the connection server attempts to set up a new VPC between this pair of switches on a new route.

Finally, as indicated at step 320 in FIG. 6, DIVA provides for dynamically changing the VPC to accommodate link and node additions and failures, addition of a switch, connection server or link, and failure of a switch, connection server or link. This dynamic process at step 320 will now be described in more detail with respect to FIGS. 10(a) and 10(b).

Figure 10A:
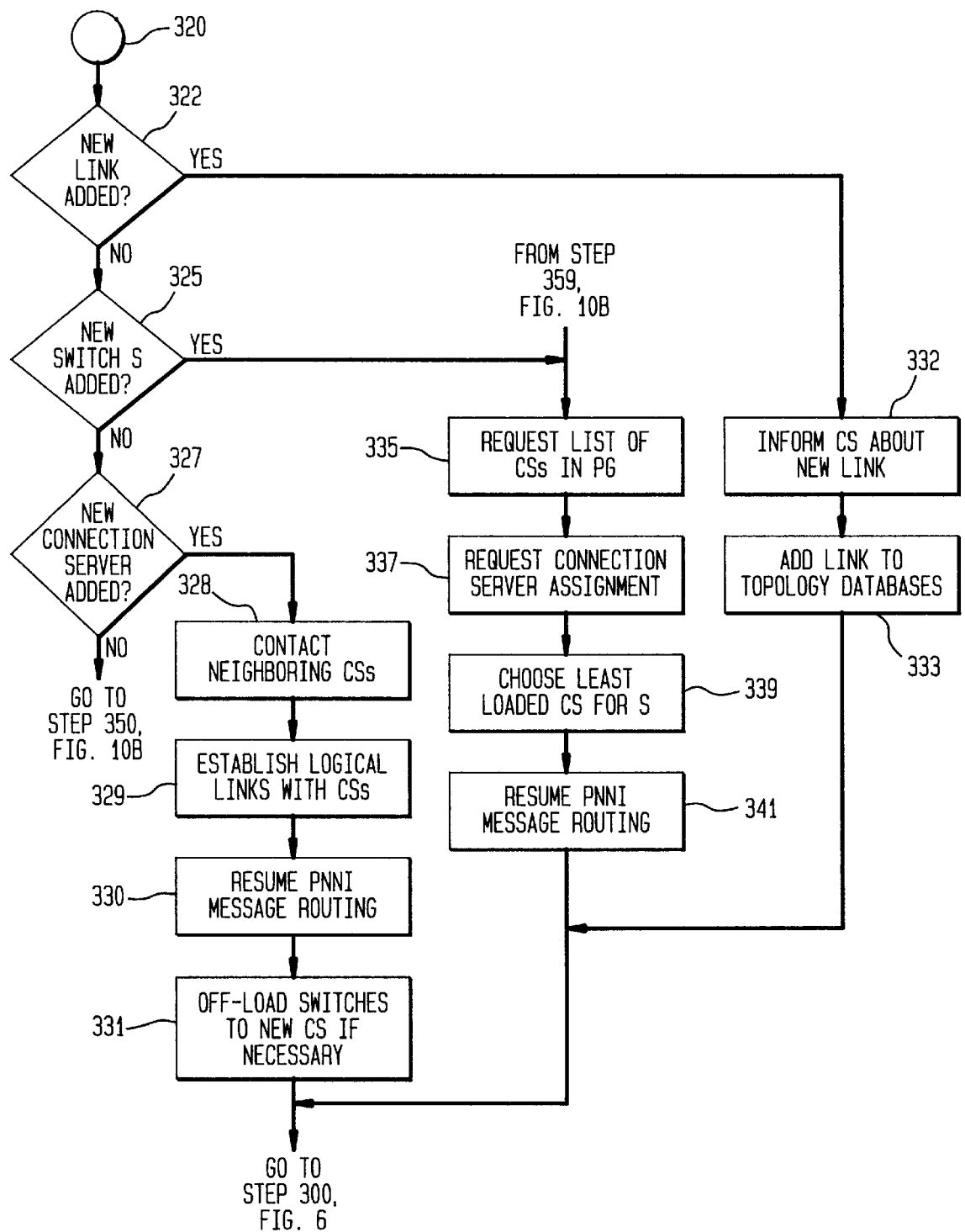
FIGS. 10(*a*) and 10(*b*) illustrate the method for determining and dynamically adjusting for failed or added network elements, e.g., links, switches, or connection servers.
Figure 10B:
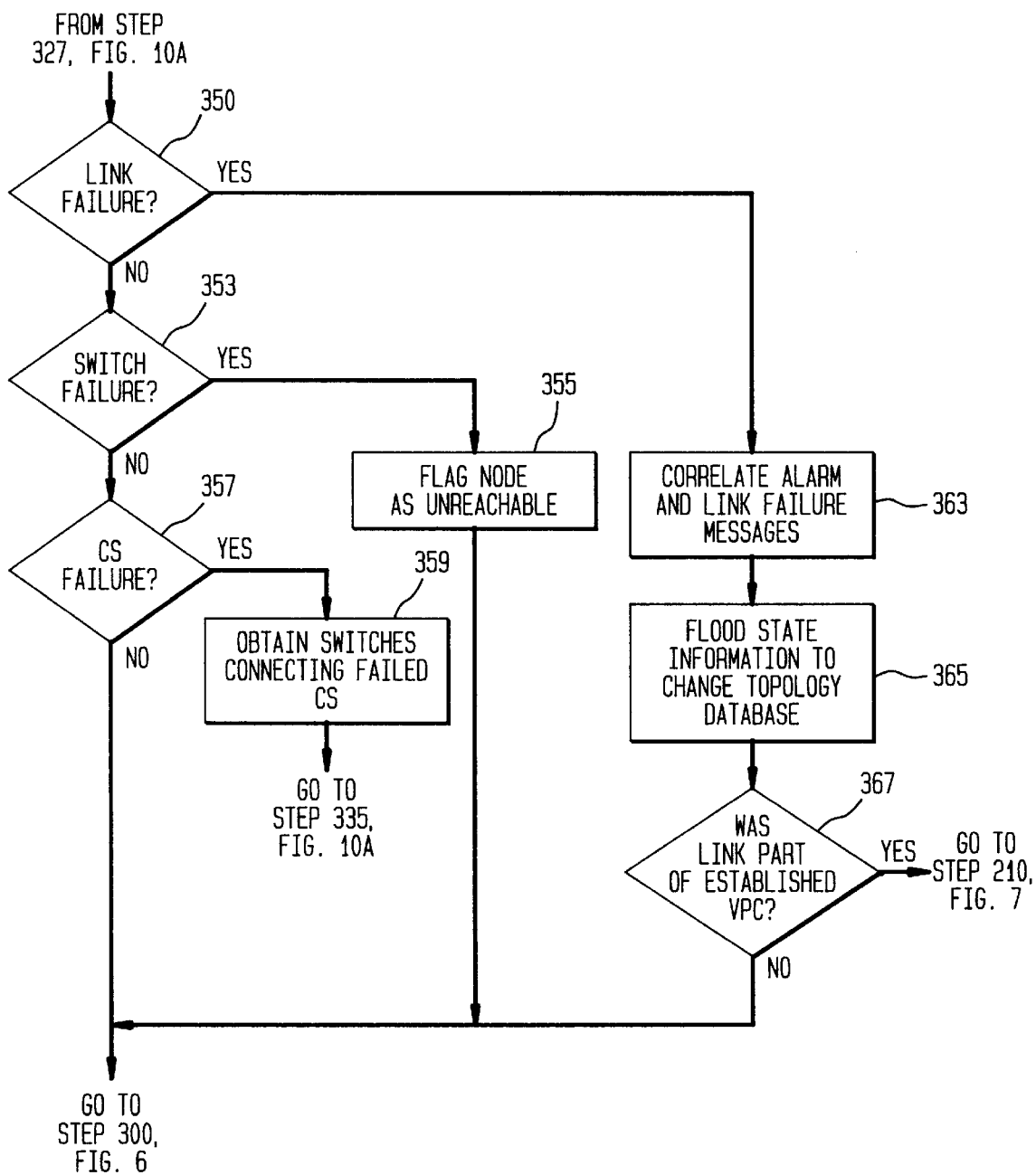

As shown at step 322 in FIG. 10(a), a determination is made as to whether a new link has been added to the network comprising the VPC. If a new link is added, the switches on either side of the newly added link inform their respective primary connection servers about the new link, as indicated at step 322. These connection servers in turn flood this information among other connection servers in the PG, which information also passes up the hierarchy if the link is between PGs. Thus, at step 333, the new link is added to the topology databases of all the necessary connection servers in the routing domain, thereby enabling the connection servers to start using the link for routing future connections.

At step 325, a determination is made as to whether a new switch, e.g., switch S, has been added (it may be a new switch or a failed switch being restored after repair). If so, then it starts the Hello protocol over each of its outgoing links. Simultaneously, at step 335, it requests a list of connection servers in its PG from its neighbors. Once it receives this information, switch S sends a Register message to a chosen connection server (using packet routing, for example, as explained earlier) $CS_c$, informing it of its status as a newly added node and requesting that it be assigned a primary connection server, as indicated at step 337. Then at step 339, $CS_c$ chooses the least loaded connection server, in its estimation, $CS_p$, in the PG, and forwards the Register message to $CS_p$ which then establishes a direct logical signaling link with S and informs S about it. Once this link is established, S starts sending periodic PTSPs on this link to $CS_p$, as indicated at step 341. The other connection servers in the PG know about S and topology state information associated with S from the PTSPs flooded periodically by $CS_p$ in the PG.

At step 327, a determination is made as to whether a new connection server, $CS_n$ comes up. If a new connection server has been added, it contacts its neighbors (which may be switches or other connection servers) to determine the address of other connection servers in the PG, as indicated at step 328. Then, at step 329, it proceeds to contact them and establish logical links to some or all of them and performs a topology database copy. Then, as indicated at step 330, it starts receiving PTSPs from other connection servers and proceeds to do the same. As indicated at step 331, other connection servers in the PGs may use a "handshake" protocol to off-load some of the switches they are currently responsible for to the newly added connection server which is lightly loaded.

As shown at step 350, in FIG. 10 (b) a determination is made as to whether there was a link failure in a VPC route. As indicated at step 350, link failures, which may be both intermittent and permanent, may be detected by Operation and Maintenance (OAM) functions executed at different levels of the network hierarchy, namely, the physical layer OAM, ATM VP and VC layer OAM. Details of the Operation and Maintenance functions may be found in the reference ITU-T: Recommendation I.610, *B-ISDN Operation and Maintenance Principles and Functions*, Rev. 1, Geneva, 1993. Additionally, Hello packets running at the PNNI routing protocol layer aid in detecting failures because, when a link goes down, for example, the nodes on either side of the link stop receiving Hello "heartbeat" packets from the node across the link and pass this information up to their primary connection servers. As indicated at step 363, the connection servers will receive the alarm and failure messages from OAM to determine the source of the link failure. Correlating the alarms and failure indication messages received from different levels of the hierarchy and determining their cause is a complex problem, however, the connection server may implement one of the available algorithms for solving this problem. For instance, the algorithm described in I. Katzela and M. Schwartz, "Fault identification schemes in communication networks," *IEEE Trans. Networking*, December 1995, incorporated by reference as if fully set forth herein, may be used to determine the failed network element. For example, using the information about missing Hello packets, the connection servers could determine the link that has failed. This information is then flooded, inside the network, as indicated at step 365, and eventually reaches the topology databases of necessary connection servers which then do not use the failed element in computing future routes. Additionally, as indicated at step 367, when a connection server CS determines that a link l has failed, it reroutes any VPCs that it is monitoring, which use this link, by returning to step 210, FIG. 7. Other wise, the monitoring process continues. The reuse of signaling software for VPC setup/modification and PCC for fast connection setup are the two aspects of DIVA that enable fast restoration of VPCs.

As shown at step 353, in FIG. 10 (*b*) a determination is made as to whether there was a switch failure. The failure of a switch is equivalent to the failure of all the links around it. Thus, as indicated at step 355, the node having the failed switch is marked unreachable by the connection servers and is not used for routing connections.

At step 357, FIG. 10(*b*), a determination is made as to whether there was a connection server failure. If there was a connection server failure, then, at step 359, each switch SW for which it was the primary connection server goes through the procedure followed by a switch that is newly added to the network, e.g., as explained above at step 335, FIG. 10(*a*). Thus, Switch SW simply chooses another connection server $CS_2$ as its primary connection server, and starts sending their PTSPs to $CS_2$.

The foregoing merely illustrates the principles of the present invention. Those skilled in the art will be able to devise various modifications, which although not explicitly described or shown herein, embody the principles of the invention and are thus within its spirit and scope.

What is claimed is:

1. Dynamic virtual path connection management system in a hierarchical ATM network comprising:
   a) means for obtaining parameters characterizing a virtual path desired to be provisioned between said two switching nodes in said network and communicating said parameters to a first control device associated with a said switching node in said network;
   b) means for communicating information relating to switching element resources currently available at each switching node contained in said network to said first control device;
   c) means for computing from said parameters and switching element resource information an optimal route between said two switching nodes that is capable of realizing a virtual path connection there between; and,
   d) means for allocating switching element resources for switching elements contained in said computed route.

2. Dynamic virtual path connection management system according to claim 1, wherein said route of said virtual path connection includes one or more switches and interconnecting links, said means for computing including means for allocating bandwidth and buffer size resources among each said one or more switches along said route.

3. Dynamic virtual path connection management system according to claim 1, further comprising a first message routing scheme for communicating messages sequentially between each said switch of said route.

4. Dynamic virtual path connection management system according to claim 3, further comprising a second message routing scheme for simultaneously communicating resource allocation messages in parallel from said computing means to each of its associated switches along the route.

5. Dynamic virtual path connection management system according to claim 2, further including a switch server associated with a switch along said route, said switch server for receiving resource allocation messages from said computing means and for configuring its associated switch in accordance with bandwidth and buffer resource constraints.

6. Dynamic virtual path connection management system according to claim 1, further including means for monitoring service usage along said route of said realized virtual path connection, whereby said computing means re-allocates said resources of said virtual path connection for accommodating on demand service changes along said route.

7. Dynamic virtual path connection management system according to claim 6, wherein said means for monitoring service usage of said virtual path connection includes monitoring on demand service requests at each said switch for a predetermined window of time, each said switch server associated with a respective switch communicating status of said switch to said computing means.

8. Dynamic virtual path connection management system according to claim 2, wherein said computing means compares said bandwidth resources of a particular switch with first and second predetermined threshold values, and communicates a message to said particular switch to decrease bandwidth allocation of said switch when said virtual path connection usage at said switch falls below said first predetermined threshold or, increase bandwidth allocation of said switch along said route when said virtual path connection usage at said switch increases above said second predetermined threshold.

9. Dynamic virtual path connection management system according to claim 2, wherein said computing means computes a new virtual path connection between said two nodes when a prior computed route for said virtual path connection is unable to achieve computed bandwidth resource allocations.

10. Dynamic virtual path connection management system according to claim 1, further including means for determining whether there are physical failures or additions of one of interconnecting links, nodes, or primary servers elements in said ATM network, and communicating information of failed or added elements via said first message routing system to other nodes in the system.

11. Method for automatically provisioning a communication channel between two switching nodes of an ATM network including a plurality of interconnected switching nodes, each said switching node including at least a switching element and an associated switch control device; said method comprising:
   a) providing at least two connection servers for path management in said ATM network;
   b) associating each said switching node with one of said at least two connection servers;

c) obtaining parameters characterizing said communication channel, said parameters includes end-to-end Cell Loss Ratio and Cell Transfer Delay between said two switching nodes of said ATM network;

d) communicating said parameters to a first connection server associated with a said switching node in said network;

e) periodically communicating information relating to switching element resources currently available at each switching node contained in said network to said first connection server;

f) from said parameters and periodically communicated current switching element resource information, computing an optimal route between said two switching nodes that is capable of realizing said communication channel and apportioning end-to-end Cell Loss Ratio and Cell Transfer Delay among said switching elements along said optimal route, and allocating new switching element resources for switching elements contained in said computed route; and g) communicating allocated switching element resources Lo each switch control device associated with a switching node along said route, each said switch control device configuring a respective switching element to maintain said new switching resources allocated thereto.

12. Method for automatically provisioning a communication channel according to claim 11, wherein said end-to-end Cell Loss Ratio is apportioned equally among said switching elements along said route.

13. Method for automatically provisioning a communication channel according to claim 11, wherein said end-to-end Cell Transfer Delay is apportioned equally among said switching elements along said route.

14. Method for automatically provisioning a communication channel between two switching nodes of an ATM network including a plurality of interconnected switching nodes, each said switching node including at least a switching element and an associated switch control device; said method comprising:

a) providing at least two connection servers for path management in said ATM network;

b) associating each said switching node with one of said at least two connection servers;

c) obtaining parameters characterizing said communication channel;

d) communicating said parameters to a first connection server associated with a said switching node in said network;

e) periodically communicating information relating to switching element resources currently available at each switching node contained in said network to said first connection server;

f) from said parameters and periodically communicated current switching element resource information, computing an optimal route between said two switching nodes that is capable of realizing said communication channel and allocating new switching element resources for switching elements contained in said computed route; and, g) communicating allocated switching element resources to each switch control device associated with a switching node along said route, said communicating performed sequentially between each switching node along said route by means of a PNNI message routing scheme, each said switch control device configuring a respective switching element to maintain said new switching resources allocated thereto.

15. Method for automatically provisioning a communication channel between two switching nodes of an ATM network including a plurality of interconnected switching nodes, each said switching node including at least a switching element and an associated switch control device; said method comprising:

a) determining where to set up said communication channel by monitoring online traffic between end nodes and determining a number of connection setup requests over a certain window of time;

b) determining whether said number of connection setup requests exceeds a predetermined threshold;

c) computing a route between said end nodes by providing at least two connection servers for path management in said ATM network, associating each of said switching node with one of said at least two connection servers and obtaining parameters characterizing said communication channel;

d) communicating said parameters to a first connection server associated with a said switching node in said network;

e) periodically communicating information relating to switching element resources currently available at each switching node contained in said network to said first connection server;

f) from said parameters and periodically communicated current switching element resource information, computing an optimal route between said two switching nodes that is capable of realizing said communication channel and allocating new switching element resources for switching elements contained in said computed route; and, g) communicating allocated switching element resources to each switch control device associated with a switching node along said route, each said switch control device configuring a respective switching element to maintain said new switching resources allocated thereto.

16. Method for automatically provisioning a communication channel between two switching nodes of an ATM network including a plurality of interconnected switching nodes, each said switching node including at least a switching element and an associated switch control device; said method comprising:

a) providing at least two connection servers for path management in said ATM network;

b) associating each said switching node with one of said at least two connection servers;

c) obtaining parameters characterizing said communication channel;

d) communicating said parameters to a first connection server associated with a said switching node in said network;

e) periodically communicating information relating to switching element resources currently available at each switching node contained in said network to said first connection server;

f) from said parameters and periodically communicated current switching element resource information, computing an optimal route between said two switching nodes that is capable of realizing said communication channel and allocating new switching element resources for switching elements contained in said computed route, g) allocating bandwidth resources for each switching element by: determining an upper threshold on the bandwidth to be allocated, said upper threshold being the minimum of the maximum bandwidth available on an outgoing link from a switch and the peak rate of the traffic along said computer route, determining upper thresholds on the Cell Transfer Delay and Cell Loss Ratio that the connection can experience at a particular switch, and determining the maximum buffer space available at said particular switch;

h) communicating allocated switching element resources to each switch control device associated with a switching node along said route, each said switch control device configuring a respective switching element to maintain said new switching resources allocated thereto.

17. Method for automatically provisioning a communication channel according to claim 11, wherein said step g) of communication allocated switching element resources to each respective switch control device includes communicating allocated switching element resources sequentially between each said switching element of said route.

18. Method for automatically provisioning a communication channel according to claim 11, wherein said ATM network implements a message routing scheme for sequentially communicating allocated switching element resources between each respective switch control device along said route.

19. Method for automatically provisioning a communication channel according to claim 17, wherein said first connection server is associated with one or more of a group of switching nodes, said step g) of communicating allocated switching element resources to each respective control device includes communicating allocated switching element resources substantially simultaneously from said first connection server to each said switch control device of an associated node computed as part of said route.

20. Method for automatically provisioning a communication channel according to claim 17, wherein said first connection server maintains topological information regarding status of switching element resources for nodes in said computed route.

21. Method for automatically provisioning a communication channel according to claim 17, wherein said ATM network is organized as groups of interconnected nodes, said first connection server maintaining topological information regarding status of switching element resources for its associated group of nodes in said computed route.

22. Method for automatically provisioning a communication channel according to claim 21, wherein said ATM network contains one or more groups of nodes organized in a first hierarchical level, each said group of nodes having an associated connection server for communicating in a second hierarchical level, said method further including the step of communicating topological information of available switching element resources contained in nodes between connection servers of each associated one or more groups of nodes at said second hierarchical level.

23. Method for automatically provisioning a communication channel according to claim 22, whereby a computer route contains switching nodes located in different groups, said step g) of communicating allocated switching element resources to each receptive switch control device along said route includes communicating allocated switching element resources sequentially between nodes of one group to nodes located in subsequent groups.

24. Method for automatically provisioning a communication channel according to claim 11, wherein said switching element resources include bandwidth and buffer size of said switching elements, each said switch control device configuring a respective switching element to maintain new bandwidth resources allocated thereto.

25. Method for automatically provisioning a communication channel according to claim 24, further including the steps of:

h) monitoring switching element resource usage along said route of said communication channel; and i) re-allocating said switching element resources of nodes contained along said route for accommodating on demand service changes along said route.

26. Method for automatically provisioning a communication channel according to claim 25, wherein said monitoring step h) includes continually repeating steps c), d) and e).

27. Method for automatically provisioning a communication channel according to claim 26, wherein said re-allocating step i) includes comparing said bandwidth resource information with a predetermined threshold and increasing said bandwidth resources of one or more switching elements along said route when on demand service along said route increases above a predetermined threshold, and decreasing said bandwidth resources of a switching element along said route when on demand service along said route decreases below a predetermined threshold.

28. Method for automatically provisioning a communication channel according to claim 27, wherein said re-allocating step i) includes increasing said buffer quantity of a switch along said route when on demand service along said route increases above a predetermined threshold.

29. Method for automatically provisioning a communication channel according to claim 25, wherein said re-allocating resources step i) includes computing a second route between said two nodes by repeating steps c) through 0 when on demand service along said route increases above a predetermined threshold.

30. Method for automatically provisioning a communication channel according to claim 11, wherein said parameters characterizing said communication channel between said two nodes include a number of calls to be accommodated in the communication channel.

31. Method for automatically provisioning a communication channel according to claim 11, wherein the computing step further includes obtaining parameter data comprising specified call blocking probabilities and offered traffic and calculating therefrom the number of calls accommodated by the communication channel.

32. Method for automatically provisioning a communication channel according to claim 25, wherein said monitoring step further includes the step of determining whether there are physical failures or additions of one of links, nodes, or connection servers in said ATM network.

33. Method for automatically provisioning a communication channel according to claim 32, wherein said message routing scheme includes exchanging information to establish an identity for a said switch and a corresponding connection server for said switch in said ATM network.

* * * * *